(12) United States Patent
Tanaka

(10) Patent No.: US 9,547,567 B2
(45) Date of Patent: Jan. 17, 2017

(54) INFORMATION PROCESSING SYSTEM AND PROCESSING METHOD FOR INFORMATION PROCESSING SYSTEM

(71) Applicant: FUJITSU LIMITED, Kawasaki-shi, Kanagawa (JP)

(72) Inventor: Ryota Tanaka, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 587 days.

(21) Appl. No.: 14/035,282

(22) Filed: Sep. 24, 2013

(65) Prior Publication Data

US 2014/0025989 A1    Jan. 23, 2014

Related U.S. Application Data

(63) Continuation of application No. PCT/JP2011/001843, filed on Mar. 28, 2011.

(51) Int. Cl.
| G06F 11/00 | (2006.01) |
| G06F 11/20 | (2006.01) |
| G06F 1/30 | (2006.01) |

(52) U.S. Cl.
CPC ............ *G06F 11/2092* (2013.01); *G06F 1/30* (2013.01); *G06F 11/2028* (2013.01); *G06F 11/2038* (2013.01)

(58) Field of Classification Search
CPC . G06F 11/202; G06F 11/2038; G06F 11/2041; G06F 11/2089; G06F 11/2092
See application file for complete search history.

(56) References Cited

U.S. PATENT DOCUMENTS

| 4,766,834 A | 8/1988 | Miyayama et al. |
| 6,058,490 A * | 5/2000 | Allen ................... G06F 11/0709 714/5.11 |
| 2002/0133744 A1* | 9/2002 | Oldfield .............. G06F 11/2092 714/11 |

(Continued)

FOREIGN PATENT DOCUMENTS

| JP | 62-191299 | 8/1987 |
| JP | 04-362744 | 12/1992 |

(Continued)

OTHER PUBLICATIONS

International Search Report mailed May 10, 2011 in corresponding International Application No. PCT/JP2011/001843.

(Continued)

*Primary Examiner* — Michael Maskulinski
(74) *Attorney, Agent, or Firm* — Staas & Halsey LLP

(57) ABSTRACT

An information processing system includes a first control unit including a first memory configured to store first software, and a first controller configured to perform processing based on the first software and to update the first software in a case where an instruction to update the first software is received, and a second control unit configured to be coupled to the first control unit, the second control unit including a second memory configured to store second software that is the same as the first software, a second controller configured to perform processing based on the second software, and a first power supply circuit configured to start power supply to the second controller in a case where a failure in the first control unit is detected.

8 Claims, 10 Drawing Sheets

(56) References Cited

U.S. PATENT DOCUMENTS

| | | | |
|---|---|---|---|
| 2005/0210191 A1* | 9/2005 | Kobayashi | G06F 3/0625 |
| | | | 711/114 |
| 2006/0143498 A1* | 6/2006 | Hatasaki | G06F 11/2025 |
| | | | 714/6.32 |
| 2008/0155333 A1* | 6/2008 | Brundidge | G06F 11/0727 |
| | | | 714/36 |
| 2010/0064165 A1 | 3/2010 | Kambara et al. | |
| 2010/0185833 A1 | 7/2010 | Saito et al. | |
| 2013/0179532 A1* | 7/2013 | Tameshige | G06F 11/2033 |
| | | | 709/213 |

FOREIGN PATENT DOCUMENTS

| | | |
|---|---|---|
| JP | 7-13787 | 1/1995 |
| JP | 2007-87269 | 4/2007 |
| JP | 2009-205409 | 9/2009 |
| JP | 2010-067042 | 3/2010 |
| JP | 2010-146087 | 7/2010 |
| WO | WO 2008/152790 | 12/2008 |

OTHER PUBLICATIONS

Japanese Notification of Reasons for Refusal dated Oct. 7, 2014 in Japanese Application No. 2013-506822.

\* cited by examiner

FIG. 3

|  | CONTROL UNIT 100 (ACTIVE SYSTEM) | CONTROL UNIT 200 (BACKUP SYSTEM) |
|---|---|---|
| FIRST POWER SUPPLY SYSTEM DEVICE 120/220 | ON | ON |
| SECOND POWER SUPPLY SYSTEM DEVICE 140/240 | ON | OFF |

FIG. 6

| (X1) INPUT | (X2) INPUT | (X3) INPUT |
|---|---|---|
| 0 | 0 | 0 |
| 0 | 1 | 1 |
| 1 | 0 | 1 |
| 1 | 1 | 0 |

FIG. 7

| SIGNAL | INPUT OR OUTPUT | REGISTER VALUE |
|---|---|---|
| PORT 0 (CORRESPOND TO (A)+POWER_ENABLE FOR CONTROL UNIT 100) | OUTPUT | 1: POWER ON (TURN ON SECOND POWER SUPPLY CIRCUIT 130 OF CONTROL UNIT 100) 0: POWER OFF (TURN OFF SECOND POWER SUPPLY CIRCUIT 130 OF CONTROL UNIT 100) |
| PORT 1 (CORRESPOND TO (B)+OTHER_ENABLE FOR CONTROL UNIT 200) | OUTPUT | 0: NORMAL (NORMAL STATE WITHOUT ERROR) 1: ERROR (DUE TO OCCURRENCE OF ERROR IN CONTROL UNIT 100, SECOND POWER SUPPLY CIRCUIT 230 OF CONTROL UNIT 200 IS TURNED ON) |
| PORT 2 (CORRESPOND TO (B)+OTHER_ENABLE FOR CONTROL UNIT 100) | INPUT | 0: NORMAL (NORMAL STATE WITHOUT ERROR) 1: ERROR (DUE TO OCCURRENCE OF ERROR IN CONTROL UNIT 200, SECOND POWER SUPPLY CIRCUIT 130 OF CONTROL UNIT 100 IS TURNED ON) |
| PORT 3 (CORRESPOND TO (C)+WDT_ENABLE FOR CONTROL UNIT 100) | INPUT | 0: NORMAL (NORMAL STATE WITHOUT ERROR) 1: ERROR (DUE TO OCCURRENCE OF ERROR IN CONTROL UNIT 200, SECOND POWER SUPPLY CIRCUIT 130 OF CONTROL UNIT 100 IS TURNED ON) |

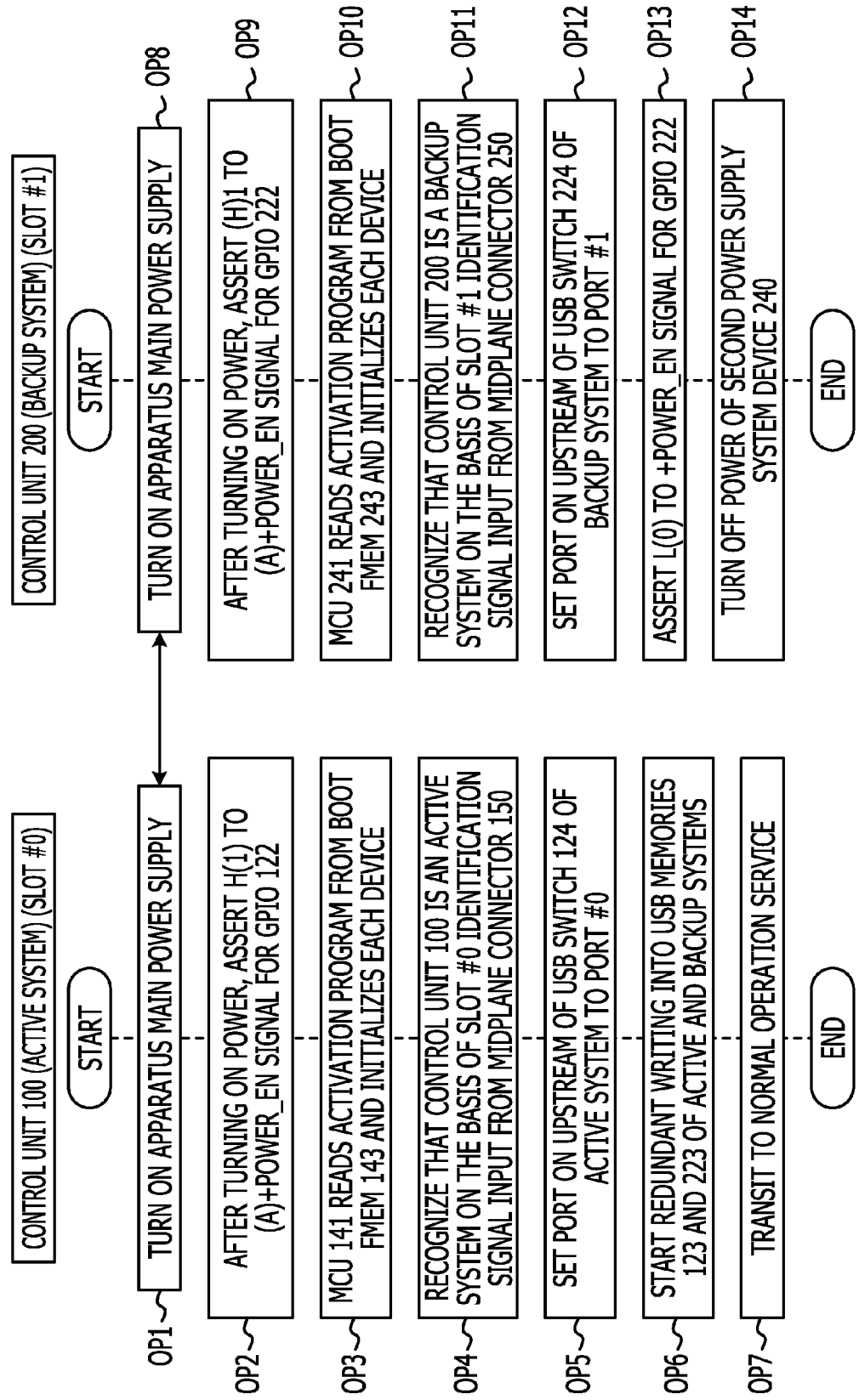

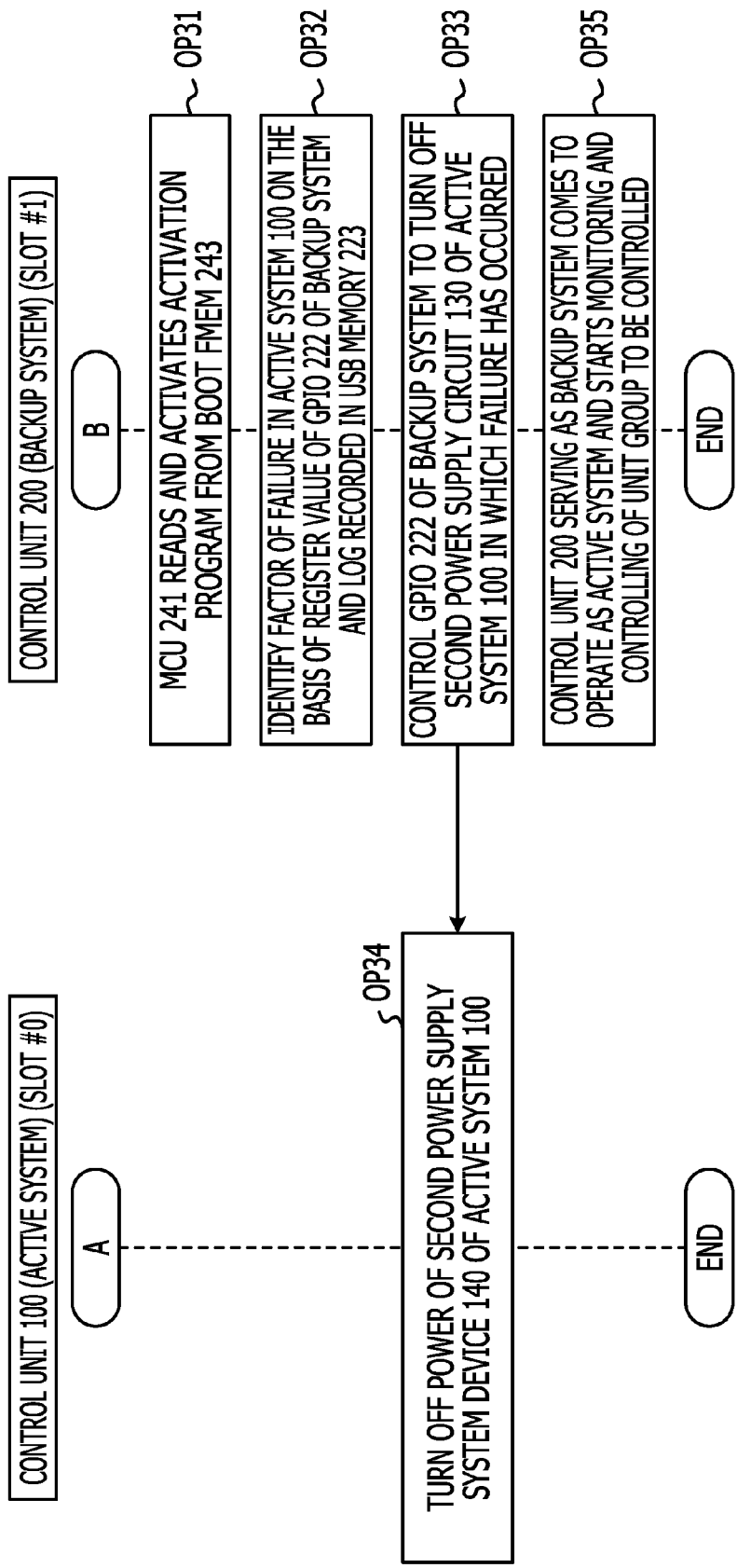

INFORMATION PROCESSING SYSTEM AND PROCESSING METHOD FOR INFORMATION PROCESSING SYSTEM

CROSS-REFERENCE TO RELATED APPLICATION

This application is a continuation application of International Application PCT/JP2011/001843 filed on Mar. 28, 2011 and designated the U.S., the entire contents of which are incorporated herein by reference.

FIELD

The embodiments discussed herein are related to an information processing system and a processing method for the information processing system.

BACKGROUND

In recent years, as information processing systems for which high reliability is demanded, an information processing system has been known in which, in order to increase the failure tolerance, control devices including hardware, such as a processor, are provided redundantly and both the control devices are caused to perform information processing. Such an information processing system has a function of continuing information processing using an input/output signal to a backup control device that is operating normally even when an error occurs in a control device that is being used as an active control device.

Japanese Laid-open Patent Publication No. 62-191299 discloses an example of a related art.

SUMMARY

According to an aspect of the invention, an information processing system includes a first control unit including a first memory configured to store first software, and a first controller configured to perform processing based on the first software and to update the first software in a case where an instruction to update the first software is received, and a second control unit configured to be coupled to the first control unit, the second control unit including a second memory configured to store second software that is the same as the first software, a second controller configured to perform processing based on the second software, and a first power supply circuit configured to start power supply to the second controller in a case where a failure in the first control unit is detected.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 illustrates the power supply on/off state when control units normally operate in an embodiment;

FIG. 6 is a diagram for explaining a truth-value table of an exclusive OR circuit of a control circuit in an embodiment;

FIG. 7 is a diagram for explaining the relationship between a signal and a register value of a GPIO of a control unit in an embodiment;

FIG. 8 is a sequence diagram illustrating an activation process after an apparatus main power supply of a control unit is turned on in an embodiment;

FIG. 10 is a sequence diagram illustrating the process performed in the case where a failure in the control unit has occurred in the embodiment.

DESCRIPTION OF EMBODIMENTS

In a duplexed information processing system, when a fault occurs in an active control device, all the processes being performed at the active control device are to be taken over by a backup control device. Thus, the backup control device is to be operated based on the same software as that of the active control device. Since the backup control device is in a power-on state at all times and updates software of the backup control device in accordance with software updating in the active control device, power consumption of the information processing system increases.

Hereinafter, embodiments will be explained in detail with reference to the drawings.

Figure 1:
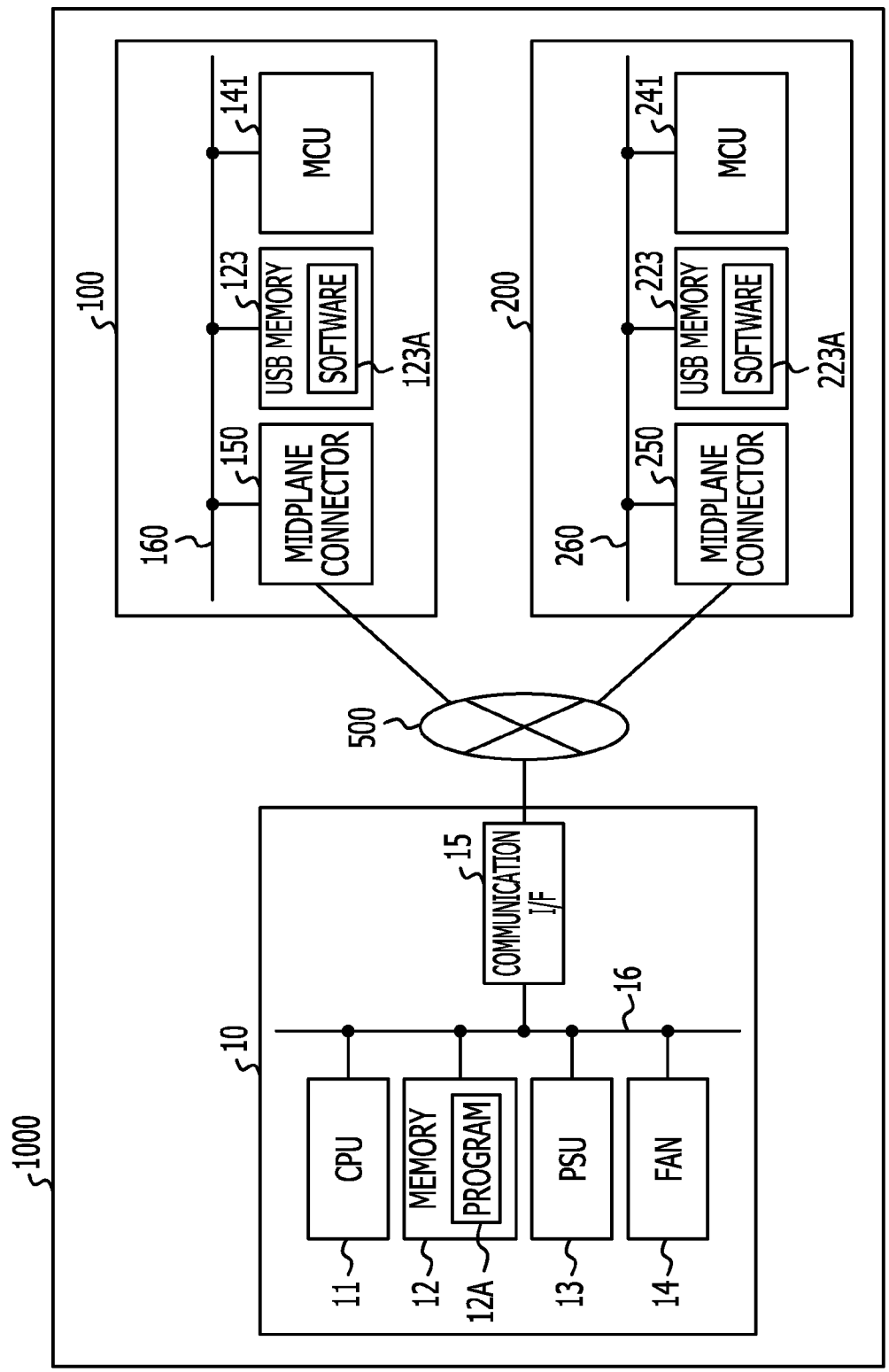
FIG. 1 illustrates an example of the hardware configuration of an information processing system according to an embodiment.

FIG. 1 illustrates an example of the hardware configuration of an information processing system according to an embodiment. As illustrated in FIG. 1, an information processing system 1000 includes an information processing apparatus 10, a control unit 100, and a control unit 200. The information processing system 1000 also includes a network 500 that allows connection between the information processing apparatus 10 and the control unit 100 and connection between the information processing apparatus 10 and the control unit 200. The control unit 100 and the control unit 200 have the same configuration. Parts of the control unit 200 that are similar to those of the control unit 100 are referred to with the same reference signs and explanation for those same parts will be omitted.

The information processing apparatus 10 includes a central processing unit (CPU) 11, a memory 12, a power supply unit (PSU) 13, a fan unit 14, a communication interface 15, and a bus 16. The CPU 11, the memory 12, the PSU 13, the fan unit 14, and the communication interface 15 are coupled to one another via the bus 16.

The CPU 11 performs various types of processing of the information processing apparatus 10.

The memory 12 temporarily stores at least some of a program of an operating system (OS) performed by the CPU 11, an application program, and a program for controlling the information processing apparatus 10. The memory 12 also stores various data to be used for processing by the CPU 11.

A program 12A may be stored in a storage medium different from the memory 12. The program 12A is stored in, for example, a portable physical storage medium, such as a flexible disk (FD), a compact disc-read only memory (CD-ROM), a magneto-optical (MO) disk, a digital versatile disc (DVD), or an IC card, to be inserted into the information processing apparatus 10. The program 12A may be stored in a disk device provided inside or outside the information processing apparatus 10 or a storage medium (not illustrated) provided in an external computer or server coupled to the information processing apparatus 10 via a local area network (LAN), a network, a public line, the Internet, a wide area network (WAN), or the like. The CPU 11 reads the program 12A from the memory 12 and executes the program 12A.

The PSU 13 supplies direct current voltage to the CPU 11, the memory 12, the fan unit 14, and the communication interface 15 of the information processing apparatus 10.

The fan unit 14 cools the CPU 11, the memory 12, the PSU 13, and the communication interface 15 of the information processing apparatus 10.

The communication interface 15 is provided so that the information processing apparatus 10 is coupled to the control unit 100 and the control unit 200 via the network 500. The communication interface 15 provides an interface function of transferring data between the CPU 11 and the memory 12.

The control unit 100 includes a microcontroller unit (MCU) 141, a Universal Serial Bus (USB) memory 123, which is an example of a memory, a midplane connector 150, and a bus 160. The MCU 141, the USB memory 123, and the midplane connector 150 are coupled to one another via the bus 160.

The control unit 100 has the same configuration as the control unit 200. The control unit 100 and the control unit 200 are capable of performing equivalent and the same operation. The control unit 100 has a function of detecting an internal failure occurring in the control unit 100. The result of detection of an internal failure is transmitted via the midplane connector 150 and the network 500 to the control unit 200. In the case where a failure has occurred in the control unit 100, by coupling, instead of the control unit 100, the control unit 200 to the information processing apparatus 10, power supply control, initialization, and monitoring for the CPU 11, the memory 12, the PSU 13, the fan unit 14, and the communication interface 15 of the information processing apparatus 10 are achieved.

The MCU 141 performs various types of processing of the control unit 100. The MCU 141 performs power supply control, initialization, and monitoring for the CPU 11, the memory 12, the PSU 13, the fan unit 14, and the communication interface 15 of the information processing apparatus 10. The MCU 141, which is a first controller, performs processing based on software 123A stored in the USB memory 123, which is a nonvolatile memory. In the case where an instruction to update at least part of the software 123A stored in the USB memory 123 is issued, the MCU 141 updates the software 123A, for which a changing instruction has been issued, stored in the USB memory 123.

The USB memory 123 stores at least part of an OS program executed by the MCU 141, an application program, and the software 123A for controlling the control unit 100. The USB memory 123 also stores various data to be used for the processing in the MCU 141. The USB memory 123 also stores error log information for the CPU 11, the memory 12, the fan unit 14, and the communication interface 15 of the information processing apparatus 10. The USB memory 123 also stores setting information including configuration information that is capable of being set by a user of the information processing apparatus 10 in a desired manner. The USB memory 123 also stores field replacement unit (FRU) information for the CPU 11, the memory 12, the PSU 13, the fan unit 14, and the communication interface 15 of the information processing apparatus 10. The USB memory 123 also stores various types of backup information for the CPU 11 and the memory 12 of the information processing apparatus 10. The USB memory 123 also stores firmware for detecting an error in the control unit 100. The USB memory 123 also stores logs in which failure factors of the control unit 100 and the control unit 200 are recorded.

The USB memory 123 and a USB memory 223 are configured redundantly in order to ensure prevention of corruption of data stored in the USB memory 123. The USB memory 223 stores data and a program that are the same as data and software 223A stored in the USB memory 223.

The midplane connector 150 is provided so that the control unit 100 is coupled to the information processing apparatus 10 and the control unit 200 via the network 500. The midplane connector 150 allows data transfer between the control unit 100 and the information processing apparatus 10 or between the control unit 100 and the control unit 200.

The control unit 200 includes an MCU 241, a USB memory 223, and a midplane connector 250. The MCU 241, the USB memory 223, and the midplane connector 250 are coupled to one another via a bus 260.

The control unit 200 has the same configuration as the control unit 100, and the control unit 200 and the control unit 100 are capable of performing equivalent and the same operation. The control unit 200 has a function of detecting an internal failure occurring in the control unit 200. The result of detection of an internal failure is transmitted to the control unit 100 via the midplane connector 250 and the network 500. In the case where a failure has occurred in the control unit 200, by coupling, instead of the control unit 200, the control unit 100 to the information processing apparatus 10, power supply control, initialization, and monitoring for the CPU 11, the memory 12, the PSU 13, the fan unit 14, and the communication interface 15 of the information processing apparatus 10 are achieved.

In the case where a failure in the control unit 100, which is an active processing apparatus, is detected by a CPLD, which is a detector, the MCU 241, which is a second controller, performs processing based on the software 223A stored in the USB memory 223, which is a nonvolatile memory, in accordance with activation of the MCU 241. Furthermore, the USB memory 223 and the USB memory 123 are configured redundantly in order to ensure prevention of corruption of data stored in the USB memory 223. The USB memory 223 stores data and a program that are the same as data and the software 123A stored in the USB memory 123. That is, the information processing system 1000 includes the nonvolatile memories (USB memories 123 and 223) in which the software 123A and 223A are stored, the active processing apparatus (control unit 100), and the backup processing apparatus (control unit 200).

Figure 2:
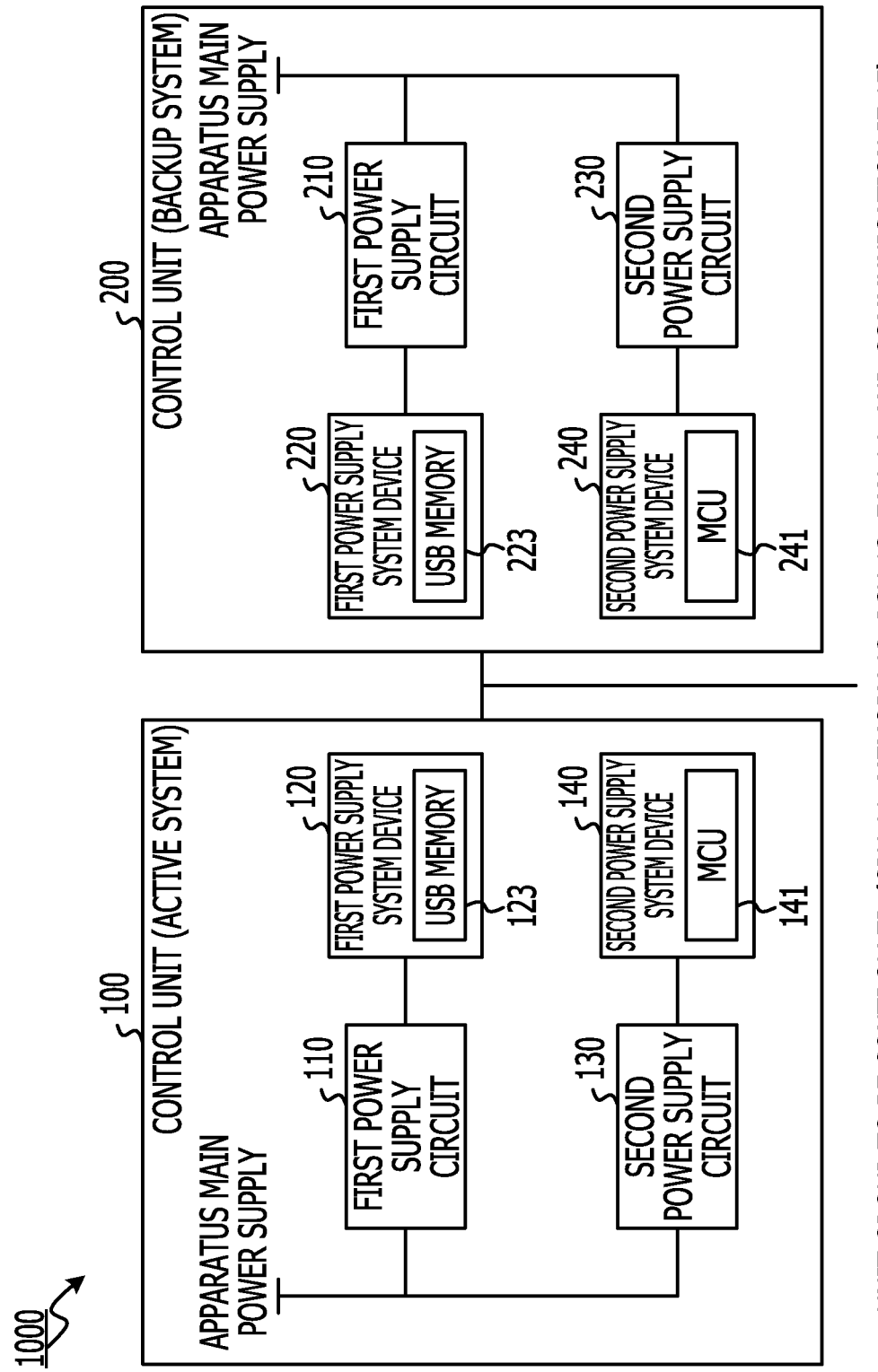
FIG. 2 is a block diagram illustrating control units in an embodiment.

FIG. 2 illustrates the configuration of the control unit 100 and the control unit 200 in an embodiment. In FIG. 2, parts similar to those explained with reference to FIG. 1 are referred to with the same reference signs and explanation for those similar parts will be omitted.

The control unit 100 includes a first power supply circuit 110, a first power supply system device 120, a second power supply circuit 130, and a second power supply system device 140. The control unit 100 includes divided two systems, that is, the first power supply circuit 110 and the second power supply circuit 130. In the example of FIG. 2, the control unit 100 operates as an active system.

The first power supply circuit 110 is coupled to an apparatus main power supply. The first power supply circuit 110 is a circuit that supplies direct current voltage to the first power supply system device 120. In the case where the control unit 100 operates as an active system, the first power supply circuit 110 supplies direct current voltage to the first power supply system device 120.

The first power supply system device 120 includes, for example, the USB memory 123. In order to achieve redundancy of data with respect to the USB memory 223 of the control unit 200, the power of the first power supply system device 120 is turned on at all times by the first power supply circuit 110. Irrespective of whether the control unit 100 is an active system or a backup system, the power of the first power supply system device 120 is turned on by the first power supply circuit 110

Similar to the first power supply circuit 110, the second power supply circuit 130 is coupled to the apparatus main power supply. The second power supply circuit 130 is a circuit that supplies direct current voltage to the second power supply system device 140. In the case where the control unit 100 operates as an active system, the second power supply circuit 130 supplies direct current voltage to the second power supply system device 140. In the case where the control unit 100 operates as a backup system, the power of the second power supply circuit 130 is not turned on.

The second power supply system device 140 includes, for example, the MCU 141. The second power supply system device 140 includes a device group to be used for communication with the control unit 200, in order to monitor and control the CPU 11, the memory 12, the PSU 13, the fan unit 14, and the communication interface 15 of the information processing apparatus 10, which are a unit group to be controlled. In the case where the control unit 100 operates as an active system, the power of the second power supply system device 140 is turned on.

The control unit 200 includes a first power supply circuit 210, a first power supply system device 220, a second power supply circuit 230, and a second power supply system device 240. Similar to the control unit 100, the control unit 200 includes divided two systems, that is, the first power supply circuit 210 and the second power supply circuit 230. In the example of FIG. 2, the control unit 200 operates as a backup system.

The first power supply circuit 210 is coupled to an apparatus main power supply. The first power supply circuit 210 supplies direct current voltage to the first power supply system device 220. Even in the case where the control unit 200 operates as a backup system, the first power supply circuit 210 supplies direct current voltage to the first power supply system device 220.

The first power supply system device 220 includes, for example, the USB memory 223. Even in the case where the control unit 200 operates as a backup system, the power of the first power supply system device 220 is turned on at all times by the first power supply circuit 210, in order to achieve redundancy of data with respect to the USB memory 123 of the control unit 100.

Similar to the first power supply circuit 210, the second power supply circuit 230 is coupled to the apparatus main power supply. The second power supply circuit 230 is a circuit that supplies direct current voltage to the second power supply system device 240. In the case where the control unit 200 operates as a backup system, the second power supply circuit 230 does not supply direct current voltage to the second power supply system device 240.

The second power supply system device 240 includes, for example, the MCU 241. The second power supply system device 240 includes a device group to be used for communication with the control unit 100, in order to monitor and control the CPU 11, the memory 12, the PSU 13, the fan unit 14, and the communication interface 15 of the information processing apparatus 10, which are a unit group to be controlled. In the case where the control unit 200 operates as a backup system, the power of the second power supply system device 240 is not turned on.

FIG. 3 illustrates the power supply on/off state when the control unit 100 and the control unit 200 operate normally in an embodiment. The case where a normal operation is performed represents the case where the control unit 100 operates as an active system and the control unit 200 operates as a backup system. In FIG. 3, parts similar to those explained with reference to FIGS. 1 and 2 are referred to with the same reference signs and explanation for those similar parts will be omitted.

As illustrated in FIG. 3, in the case where the control unit 100 operates as an active system, the power of each of the first power supply system device 120 and the second power supply system device 140 is turned on. In contrast, in the case where the control unit 200 operates as a backup system, the power of the first power supply system device 220 is turned on but the power of the second power supply system device 240 is not turned on. That is, in the case where the control unit 200 operates as a backup system, the power of only a device to be used for synchronization of data with respect to the control unit 100 operating as an active system is turned on.

Figure 4:
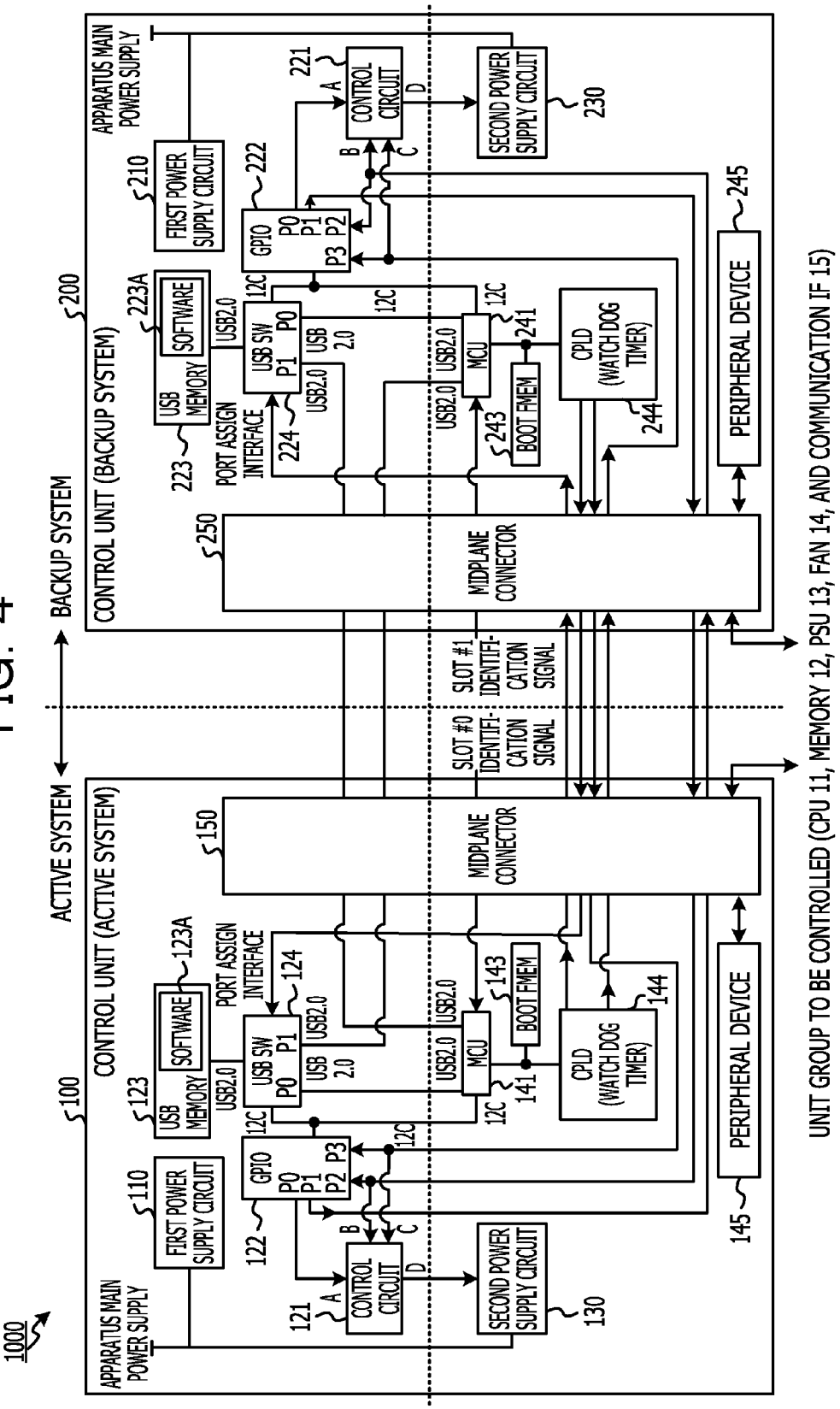
FIG. 4 is a diagram for explaining part of the internal configuration of control circuits in an embodiment.

FIG. 4 is a diagram for explaining part of the internal configuration of the control unit 100 and the control unit 200 in an embodiment. In FIG. 4, parts similar to those explained with reference to FIGS. 1 to 3 are referred to with the same reference signs and explanation for those similar parts will be omitted.

The control unit 100 includes the first power supply circuit 110, a control circuit 121, a General Purpose Input Output (GPIO) 122, the USB memory 123, a USB switch 124, the second power supply circuit 130, the MCU 141, a boot flash memory (BOOT FMEM) 143, a configurable programmable logic device (CPLD) 144, a peripheral device 145, and the midplane connector 150. In the example of FIG. 4, the control unit 100 operates as an active system.

The first power supply system device 120 described with reference to FIG. 2 includes the control circuit 121, the GPIO 122, the USB memory 123, and the USB switch 124. As described in FIG. 2, the first power supply system device 120 is supplied with direct current voltage from the first power supply circuit 110. The second power supply system device 140 described with reference to FIG. 2 includes the MCU 141, the BOOT FMEM 143, the CPLD 144, and the peripheral device 145. As described with reference to FIG. 2, the second power supply system device 140 is supplied with direct current voltage from the second power supply circuit 130.

The control circuit 121 is coupled to the GPIO 122 and the second power supply circuit 130 of the control unit 100, and a control circuit 221, a GPIO 222, and a CPLD 244 of the control unit 200 via buses. The control circuit 121 issues an instruction to turn on or turning off the power of the second power supply circuit 130, in accordance with instructions from the GPIO 122, the GPIO 222, and the CPLD 244, via buses.

The GPIO 122 is coupled to the MCU 141 via an Inter-Integrated Circuit (I2C). The GPIO 122 performs setting for Port 0, Port 1, Port 2, and Port 3, on the basis of an instruction from the MCU 141 via the I2C. The GPIO 122 also contains a register that stores settings for the Port 0, the Port 1, the Port 2, and the Port 3.

The Port 0 of the GPIO 122 is coupled to the control circuit 121 via a bus. The Port 1 of the GPIO 122 is coupled to Port 2 of the GPIO 222 of the control unit 200 via a bus. The Port 2 of the GPIO 122 is coupled to Port 1 of the GPIO 222 of the control unit 200 via buses through the midplane connector 150 and the midplane connector 250. The Port 3 of the GPIO 122 is coupled to the CPLD 244 of the control unit 200 via buses through the midplane connector 150 and the midplane connector 250.

The USB memory 123 is coupled to the USB switch 124 via a USB 2.0. The USB memory 123 transfers stored data to and from the USB switch 124 via the USB 2.0.

The USB switch 124 is coupled to the CPLD 244 of the control unit 200 via a port assign interface through the midplane connector 150 and the midplane connector 250. The port assign interface is an input signal for setting the Port 0 or the Port 1 of the USB switch 124. The USB switch 124 is coupled to the MCU 141 via an I2C. Port 0 of the USB switch 124 is coupled to the MCU 141 via a USB 2.0. Port 1 of the USB switch 124 is coupled to the MCU 241 of the control unit 200 via a USB 2.0 through the midplane connector 150 and the midplane connector 250.

The MCU 141 is coupled to the midplane connector 150 via a bus. The MCU 141 is coupled to the Port 0 of the USB switch 124 via the USB 2.0. The MCU 141 is coupled to Port 1 of a USB switch 224 of the control unit 200 via a USB 2.0 through the midplane connector 150 and the midplane connector 250. The MCU 141 is coupled to the BOOT FMEM 143 and the CPLD 144 via buses. The MCU 141 also contains GPIO.

The BOOT FMEM 143 is coupled to the MCU 141 via the bus.

The BOOT FMEM 143 stores an activation program for the MCU 141. A program for initializing the peripheral device 145 is embedded in the activation program stored in the BOOT FMEM 143. The activation program stored in the BOOT FMEM 143 includes processing for causing the MCU 141 to read setting information for the Port 0, the Port 1, the Port 2, and the Port 3 stored in a register of the GPIO 122 and checking a factor of activation of the MCU 141. Processing performed after the MCU 141 is activated is changed in accordance with the factor of the activation of the MCU 141.

The CPLD 144 is coupled to the MCU 141 via the bus. The CPLD 144 is coupled to the USB switch 224 of the control unit 200 via a port assign interface through the midplane connector 150 and the midplane connector 250. The CPLD 144 is coupled to Port 3 of the GPIO 222 of the control unit 200 via buses through the midplane connector 150 and the midplane connector 250. The CPLD 144 contains a watchdog timer, which is a circuit for monitoring the operation status of the MCU 141. When the MCU 141 is activated or while the MCU 141 is operating, in the case where no response has been received from the MCU 141 for a specific period of time or longer, the CPLD 144 determines that an operation failure has occurred in the MCU 141. After determining that an operation failure has occurred in the MCU 141, the CPLD 144 asserts a reset signal or a non-maskable interrupt (NMI) signal for the MCU 141 to the USB switch 224 and the Port 3 of the GPIO 222. That is, the CPLD 144 detects occurrence of a failure in the MCU 141, which is the first controller.

The peripheral device 145 includes a network interface card (NIC), a hub, an I2C controller, a dynamic random access memory (DRAM), a magnetoresistive random access memory (MRAM), a sensor, a light emitting diode (LED) controller, and an electrically erasable programmable read only memory (E2PROM). The peripheral device 145 is a device to be used for performing management and control of the information processing apparatus 10.

The midplane connector 150 is a connector that allows connection between the control unit 100 and each of the information processing apparatus 10 and the control unit 200. When the control unit 100 is coupled to a slot of the information processing system 1000, a signal corresponding to the position of the slot is input from a slot #0 of the information processing system 1000 to the midplane connector 150. The midplane connector 150 transmits to the MCU 141 an identification signal for identifying whether the control unit 100 is to operate as an active system or a backup system.

When the power of the MCU 141 is turned on by the second power supply circuit 130, the MCU 141 reads the activation program for the MCU 141 stored in the BOOT FMEM 143, and activates the MCU 141. At the time of activation of the MCU 141, the MCU 141 executes the program for initializing the peripheral device 145 stored in the BOOT FMEM 143, and initializes the peripheral device 145. At the time of activation of the MCU 141, the MCU 141 performs processing for reading, by the MCU 141, setting information for the Port 0, the Port 1, the Port 2, and the Port 3 stored in the register of the GPIO 122 from the program stored in the BOOT FMEM 143. The MCU 141 checks a factor of activation of the MCU 141 on the basis of the setting information for the Port 0, the Port 1, the Port 2, and the Port 3 stored in the register of the GPIO 122. The MCU 141 recognizes whether the control unit 100 operates as an active system or a backup system, on the basis of an identification signal input from the midplane connector 150.

The case where the MCU 141 becomes uncontrollable and the watchdog timer of the CPLD 144 times out since the watchdog timer does not detect heartbeat from the MCU 141 may occur. In this case, the CPLD 144 switches from connection by the MCU 141 via the Port 1 of the USB switch 224 into connection by the MCU 241 via the Port 0, through the port assign interface. By coupling the Port 0 of the USB switch 224 to the MCU 241, the MCU 241 is capable of being coupled to the USB memory 223 via the USB switch 224.

The control unit 200 includes the first power supply circuit 210, the control circuit 221, the GPIO 222, the USB memory 223, the USB switch 224, the second power supply circuit 230, the MCU 241, a BOOT FMEM 243, the CPLD 244, a peripheral device 245, and the midplane connector 250. The control unit 200 operates as a backup system. Parts of the control unit 200 similar to those of the control unit 100 are referred to with the same reference signs and explanation for those similar parts will be omitted.

The first power supply system device 220 explained with reference to FIG. 2 includes the control circuit 221, the GPIO 222, the USB memory 223, and the USB switch 224. As illustrated in FIG. 2, the first power supply system device 220 is supplied with direct current voltage from the first power supply circuit 210. Furthermore, the second power supply system device 240 explained with reference to FIG. 2 includes the MCU 241, the BOOT FMEM 243, the CPLD 244, and the peripheral device 245. As described with reference to FIG. 2, the second power supply system device 240 is supplied with direct current voltage from the second power supply circuit 230.

The control circuit 221 is coupled to the GPIO 222 and the second power supply circuit 230 of the control unit 200, and the GPIO 122 and the CPLD 144 of the control unit 100 via buses. The control circuit 221 issues an instruction for turning on and turning off the power of the second power supply circuit 230, in accordance with instructions from the GPIO 222, the GPIO 122, and the CPLD 144, via the buses. That is, the control circuit 221, which serves as an activation controller, outputs an activation instruction to the MCU 241, which is the second controller.

The GPIO 222 is coupled to the MCU 241 via an I2C. The GPIO 222 performs setting for Port 0, Port 1, Port 2, and Port 3, on the basis of an instruction from the MCU 241 via the I2C. The GPIO 222 includes a register storing therein setting for the Port 0, the Port 1, the Port 2, and the Port 3.

The Port 0 of the GPIO 222 is coupled to the control circuit 221 via a bus. The Port 1 of the GPIO 222 is coupled to the control circuit 121 and the Port 2 of the GPIO 122 via buses through the midplane connector 150 and the midplane connector 250. The Port 2 of the GPIO 222 is coupled to the Port 1 of the GPIO 122 via buses through the midplane connector 150 and the midplane connector 250. The Port 3 of the GPIO 222 is coupled to the CPLD 144 via buses through the midplane connector 150 and the midplane connector 250.

The USB memory 223 is coupled to the USB switch 224 via a USB 2.0. The USB memory 223 transfers data stored in the USB memory 223 to and from the USB switch 224 via the USB 2.0.

The USB switch 224 is coupled to the CPLD 144 of the control unit 100 via a port assign interface through the midplane connector 150 and the midplane connector 250. The port assign interface is an input signal for setting the Port 0 or the Port 1 of the USB switch 224. The USB switch 224 is coupled to the MCU 241 via an I2C. The Port 0 of the USB switch 224 is coupled to the MCU 241 via a USB 2.0. The Port 1 of the USB switch 224 is coupled to the MCU 141 via a USB 2.0 through the midplane connector 150 and the midplane connector 250.

The MCU 241 is coupled to the midplane connector 250 via a bus. The MCU 241 is coupled to the Port 0 of the USB switch 224 via a USB 2.0. The MCU 241 is coupled to the Port 1 of the USB switch 124 via a USB 2.0 through the midplane connector 150 and the midplane connector 250. The MCU 241 is coupled to the BOOT FMEM 243 and the CPLD 244 via buses. The MCU 241 includes GPIO.

The BOOT FMEM 243 is coupled to the MCU 241 via the bus. An activation program for the MCU 241 is stored in the BOOT FMEM 243. A program for initializing the peripheral device 245 is embedded in the activation program stored in the BOOT FMEM 243. The activation program stored in the BOOT FMEM 243 includes processing for causing the MCU 241 to read setting information for the Port 0, the Port 1, the Port 2, and the Port 3 stored in the register of the GPIO 222 and checking a factor of activation of the MCU 241. Processing performed after the MCU 241 is activated is changed in accordance with the factor of the activation of the MCU 241.

The CPLD 244 is coupled to the MCU 241 via the bus. The CPLD 244 is coupled to the USB switch 124 via a port assign interface through the midplane connector 150 and the midplane connector 250. The CPLD 244 is coupled to the Port 3 of the GPIO 122 via buses through the midplane connector 150 and the midplane connector 250. The CPLD 244 includes a watchdog timer, which is a circuit for monitoring the operation status of the MCU 241. When the MCU 241 is activated or while the MCU 241 is operating, in the case where no response has been received from the MCU 241 for a specific period of time or longer, the CPLD 244 determines that an operation failure has occurred in the MCU 241. After determining that an operation failure has occurred in the MCU 241, the CPLD 244 asserts a reset signal or a non-maskable interrupt (NMI) signal for the MCU 241 to the USB switch 124 and the Port 3 of the GPIO 222.

The peripheral device 245 includes an NIC, a hub, an I2C controller, a DRAM, an MRAM, a sensor, an LED controller, and an E2PROM. Similar to the peripheral device 145 of the control unit 100, the peripheral device 245 is a device to be used for monitoring and controlling the information processing apparatus 10.

The midplane connector 250 is a connector that allows connection between the control unit 200 and each of the information processing apparatus 10 and the control unit 100. When the control unit 200 is coupled to a slot of the information processing system 1000, a signal corresponding to the position of the slot is input from a slot #1 of the information processing system 1000 to the midplane connector 250. The midplane connector 250 transmits to the MCU 241 an identification signal for identifying whether the control unit 200 is to operate as an active system or a backup system.

In the case where the power of the MCU 241 is turned on by the second power supply circuit 230, the MCU 241 reads the activation program for the MCU 241 stored in the BOOT FMEM 243 and activates the MCU 241. At the time of activation of the MCU 241, the MCU 241 executes the program for initializing the peripheral device 245 stored in the BOOT FMEM 243, and initializes the peripheral device 245. At the time of activation of the MCU 241, the MCU 241 performs processing for reading, by the MCU 241, the setting information for the Port 0, the Port 1, the Port 2, and the Port 3 stored in the register of the GPIO 222 from the program stored in the BOOT FMEM 243. The MCU 241 checks a factor of activation of the MCU 241, on the basis of the setting information for the Port 0, the Port 1, the Port 2, and the Port 3 stored in the register of the GPIO 222. The MCU 241 recognizes whether the control unit 200 is an active system or a backup system, on the basis of an identification signal input from the midplane connector 250.

The case where the MCU 241 becomes uncontrollable and the watchdog timer of the CPLD 244 times out since the CPLD 244 does not detect heartbeat from the MCU 241 may occur. In this case, the CPLD 244 switches from connection by the MCU 241 via the Port 1 of the USB switch 124 into connection by the MCU 141 via the Port 1, through the port assign interface. By coupling the Port 0 of the USB switch 124 to the MCU 141, the MCU 141 is capable of being coupled to the USB memory 123 via the USB switch 124.

Figure 5:
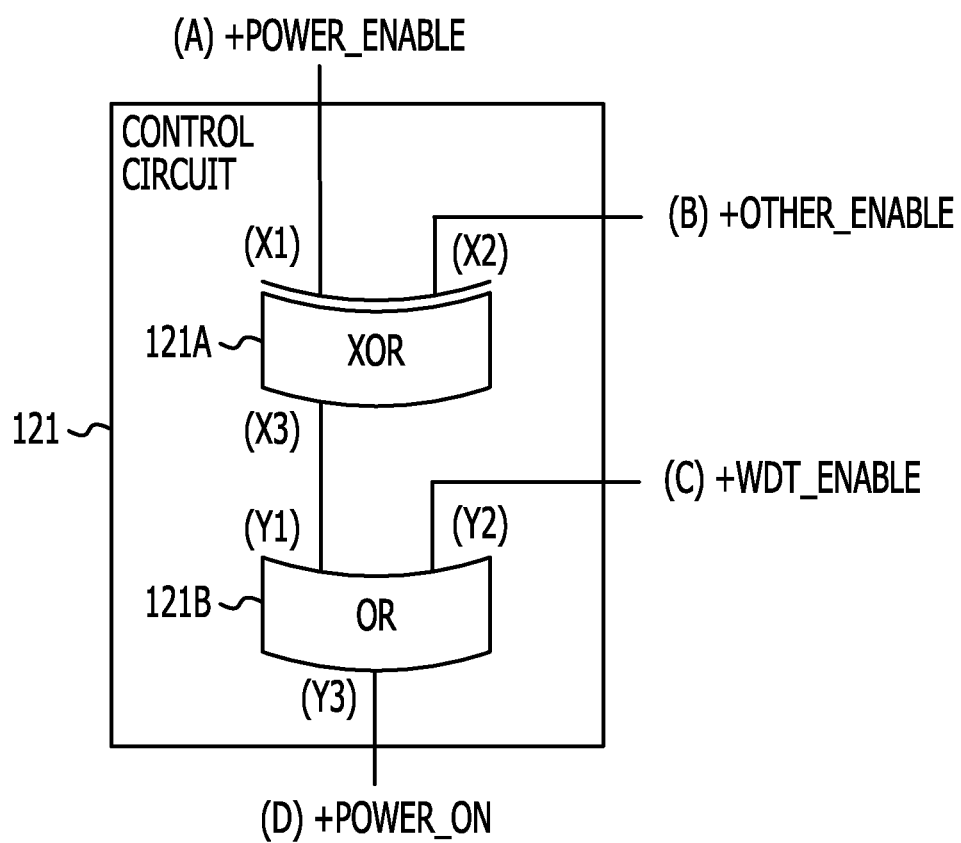
FIG. 5 is a diagram for explaining part of the internal configuration of control circuits in an embodiment.

FIG. 5 is a diagram for explaining the internal configuration of the control circuit 121 in an embodiment. In FIG. 5, parts similar to those explained with reference to FIGS. 1 to 4 are referred to with the same reference signs and explanation for those similar parts will be omitted.

As illustrated in FIG. 5, the control circuit 121 includes an exclusive OR (XOR) circuit 121A and an OR circuit 121B.

The XOR circuit 121A includes a terminal X1, a terminal X2, and a terminal X3. The terminal X1 is coupled to the Port 0 of the GPIO 122. The terminal X2 is coupled to the Port 2 of the GPIO 122 and the Port 1 of the GPIO 222 of the control unit 200. The terminal X3 is coupled to a terminal Y1 of the OR circuit 121B.

The OR circuit 121B includes the terminal Y1, a terminal Y2, and a terminal Y3. The terminal Y1 is coupled to the terminal X3 of the XOR circuit 121A. The terminal Y2 is coupled to the Port 3 of the GPIO 122 and the CPLD 244 of the control unit 200. The terminal Y3 is coupled to the second power supply circuit 130.

A POWER_ENABLE signal is input from the Port 0 of the GPIO 122 to the terminal X1. The POWER_ENABLE signal is a signal that is output for asserting a valid signal for the second power supply circuit 130 of the control unit 100. Assertion of a signal represents that the signal is set to high level. An OTHER_ENABLE signal is input from the GPIO 222 of the control unit 200 to the terminal X2. The OTHER_ENABLE signal is a signal that is output from the control unit 200 to turn on the power of the second power supply circuit 130 of the control unit 100 when an error occurs in the control unit 200. A WDT_ENABLE signal is input from the CPLD 244 of the control unit 200 to the terminal Y2. The WDT_ENABLE signal is a signal that is output from the watchdog timer built in the CPLD 244 of the control unit 200 to turn on the power of the second power supply circuit 130 of the control unit 100. A POWER_ON signal is output from the terminal Y3 to the second power supply circuit 130 of the control unit 100. The POWER_ON signal is a signal that is output for turning on the power of the second power supply circuit 130 of the control unit 100.

Figure 6:
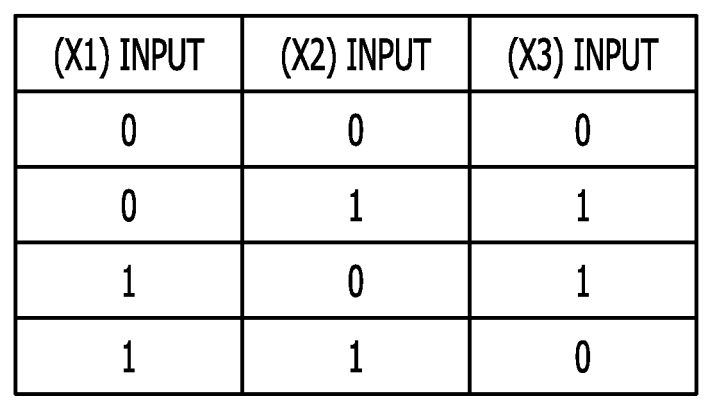

FIG. 6 is a diagram for explaining a truth-value table of the XOR circuit 121A of the control circuit 121 in an embodiment. The truth-value table illustrated in FIG. 6 is a table in which all the relationships among input and output of the XOR circuit 121A are represented using truth values.

As illustrated in FIG. 6, when "0" is input to the terminal X1 and the terminal X2, "0" is output from the terminal X3. When "0" is input to the terminal X1 and "1" is input to the terminal X2, "1" is output from the terminal X3. When "1" is input to the terminal X1 and "0" is input to the terminal X2, "1" is output from the terminal X3. When "1" is input to the terminal X1 and "1" is input to the terminal X2, "0" is output from the terminal X3.

FIG. 7 is a diagram for explaining the relationship between a signal of the GPIO 122 of the control unit 100 and a register value stored in the GPIO 122 in an embodiment. The GPIO 122 changes setting for the Port 0, the Port 1, the Port 2, and the Port 3 stored in the GPIO 122, on the basis of an instruction from the MCU 141.

A signal output from the Port 0 of the GPIO 122 corresponds to a POWER_ENABLE signal output to the control circuit 121. When the register value of the Port 0 of the GPIO 122 is set to "1", a signal for turning on the power of the second power supply circuit 130 of the control unit 100 is output from the Port 0 of the GPIO 122. When the register value of the Port 0 of the GPIO 122 is set to "0", a signal for turning off the power of the second power supply circuit 130 of the control unit 100 is output from the Port 0 of the GPIO 122.

A signal output from the Port 1 of the GPIO 122 corresponds to an OTHER_ENABLE signal output to the control circuit 221 of the control unit 200. When the register value of the Port 1 of the GPIO 122 is set to "0", a Normal signal representing the normal state without error is output from the Port 1 of the GPIO 122 to the control circuit 221 of the control unit 200. When the register value of the Port 1 of the GPIO 122 is set to "1", an Error signal for issuing an instruction to turn on the power of the second power supply circuit 230 of the control unit 200 since an error has occurred in the control unit 100, is output from the Port 1 of the 122 to the control circuit 221 of the control unit 200.

A signal input to the Port 2 of the GPIO 122 corresponds to an OTHER_ENABLE signal input from the Port 1 of the GPIO 222 of the control unit 200. When the register value of the Port 2 of the GPIO 122 is set to "0", a Normal signal representing the normal state without error is input from the Port 1 of the GPIO 222 to the Port 2 of the GPIO 122. When the register value of the Port 2 of the GPIO 122 is set to "1", an Error signal representing that the power of the second power supply circuit 130 of the control unit 100 is turned on since an error has occurred in the control unit 200 in the case where the control unit 200 operates as an active system, is input from the Port 1 of the GPIO 222 to the Port 2 of the GPIO 122.

A signal input to the Port 3 of the GPIO 122 corresponds to a WDT_ENABLE signal input from the CPLD 244 of the control unit 200. When the register value of the Port 3 of the GPIO 122 is set to "0", a Normal signal representing the normal state without error is input from the CPLD 244 of the control unit 200 to the Port 3 of the GPIO 122. When the register value of the Port 3 of the GPIO 122 is set to "1", an Error signal representing that the power of the second power supply circuit 130 of the control unit 100 is turned on since an error has occurred in the control unit 200 in the case where the control unit 200 operates as an active system, is input from the CPLD 244 of the control unit 200 to the Port 3 of the GPIO 122.

FIG. 8 is a sequence diagram illustrating a process performed in the case where the control unit 100 and the control unit 200 operate normally in an embodiment. In FIG. 8, parts similar to those explained with reference to FIGS. 1 to 7 are referred to with the same reference signs and explanation for those similar parts will be omitted. In this embodiment, the control unit 100 operates as an active system, and the control unit 200 operates as a backup system.

As illustrated in FIG. 8, when the apparatus main power supply of the control unit 100 is turned on (OP1), the power of the first power supply circuit 110 of the control unit 100 is turned on (OP2). The first power supply circuit 110 turns on the power of the first power supply system device 120. "High" (1) is asserted to the POWER_ENABLE signal output from the Port 0 of the GPIO 122 (OP2). The power of the second power supply circuit 130 of the control unit 100 is turned on (OP2). The second power supply circuit 130 turns on the power of the second power supply system device 140. The register value of the GPIO 122 represents POWER_ENABLE: 1, OTHER_ENABLE: 0, WDT_ENABLE: 0, and POWER_ON: 1.

The MCU 141 of the control unit 100 reads the activation program stored in the BOOT FMEM 143 (OP3). The MCU 141 initializes the peripheral device 145 (OP3).

The MCU 141 recognizes that the control unit 100 serves as an active system, on the basis of a Slot #0 identification signal input from the midplane connector 150 (OP4).

The MCU 141 sets a port on the upstream side of the USB switch 124 of the control unit 100 to Port 0 (OP5). That is, the MCU 141 sets the port on the side from the USB switch 124 toward the MCU 141 to Port 0 (OP5).

The MCU 141 starts writing of data and a program redundantly to the USB memory 123 of the control unit 100 and the USB memory 223 of the control unit 200 (OP6). The control unit 100 moves on to a normal operation service (OP7). In the normal operation service, the control unit 100 operates as an active system and the control unit 200 operates as a backup system.

When the apparatus main power supply of the control unit 200 is turned on (OP8), the power of the first power supply circuit 210 of the control unit 200 is turned on (OP9). The first power supply circuit 210 turns on the power of the first power supply system device 220. Then, "High" (1) is asserted to a POWER_ENABLE signal output from the Port 0 of the GPIO 222 (OP9). Then, the power of the second power supply circuit 230 of the control unit 200 is turned on (OP9). The second power supply circuit 230 turns on the power of the second power supply system device 240.

The MCU 241 of the control unit 200 reads and activates the activation program stored in the BOOT FMEM 243 (OP10). The MCU 241 initializes the peripheral device 245 (OP10).

The MCU 241 recognizes that the control unit 200 serves as a backup system, on the basis of a Slot #1 identification signal input from the midplane connector 250 (OP11).

The MCU 241 sets a port on the upstream side of the USB switch 224 of the control unit 200 to Port 1 (OP12). That is, the MCU 241 sets the port on the side from the USB switch 224 toward the MCU 241 to Port 1 (OP12).

The MCU 241 controls the GPIO 222 via the I2C, and asserts "Low" (0) to the POWER_ENABLE signal output from the Port 0 of the GPIO 222 (OP13).

When the POWER_ENABLE signal to which "Low" (0) has been asserted is input to the second power supply circuit 230, the power of the second power supply circuit 230 is turned off. Thus, the power of the second power supply system device 240 is turned off (OP14). The register value of the GPIO 222 represents POWER_ENABLE: 0, OTHER_ENABLE: 0, WDT_ENABLE: 0, and POWER_ON: 0.

Figure 9:
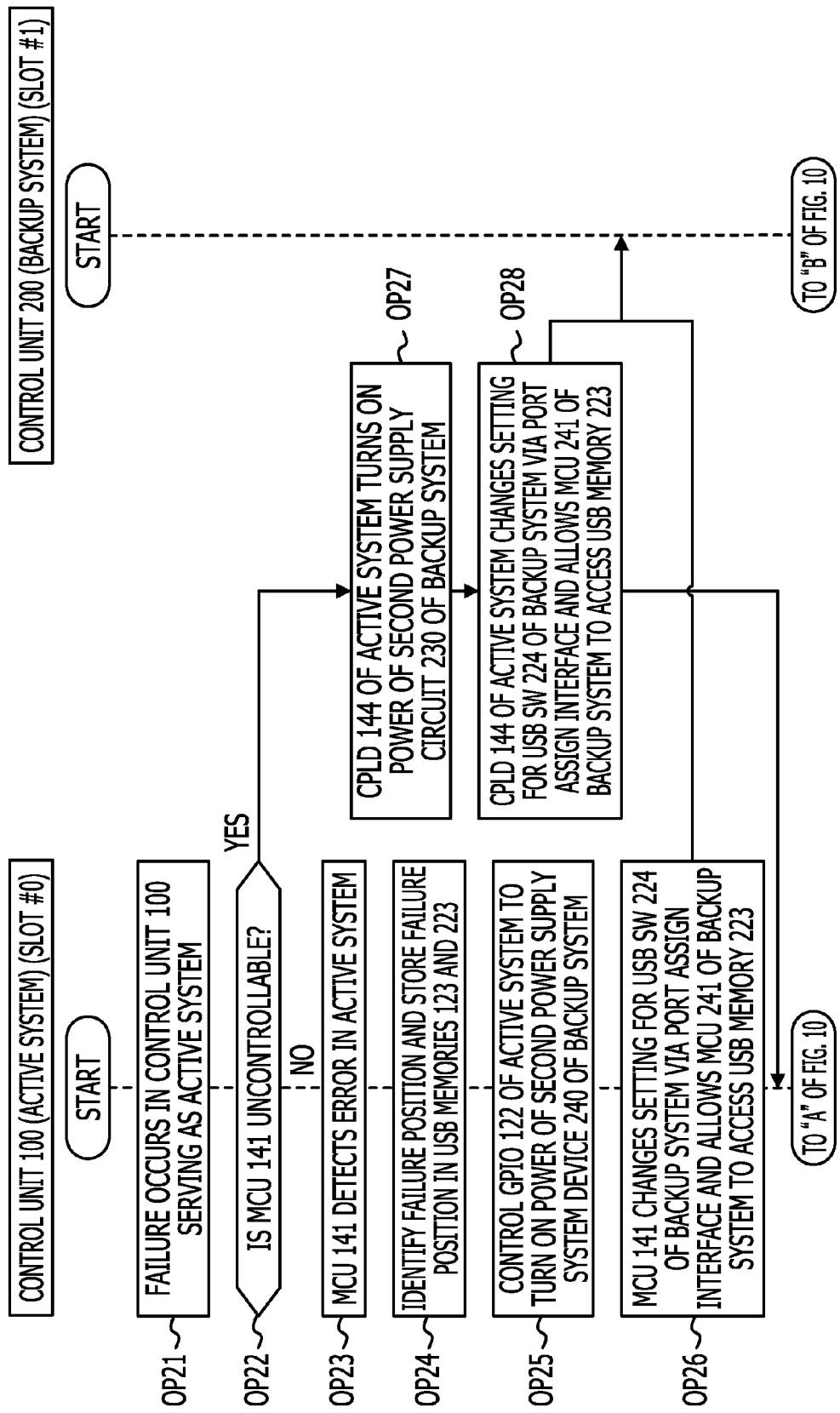
FIG. 9 is a sequence diagram illustrating a process performed in the case where a failure in a control unit has occurred in an embodiment.

FIGS. 9 and 10 are sequence diagrams illustrating a process performed in the case where a failure has occurred in the control unit 100 in an embodiment. The process illustrated in FIG. 9 continues to "A" and "B" in the sequence diagram illustrated in FIG. 10. In FIGS. 9 and 10, parts similar to those explained with reference to FIGS. 1 to 8 are referred to with the same reference signs and explanation for those similar parts will be omitted. In this embodiment, the control unit 100 operates as an active system, and the control unit 200 operates as a backup system.

As illustrated in FIG. 9, when occurrence of a failure in the control unit 100 is detected (OP21), the CPLD 144 determines, using the watchdog timer built in the CPLD 144, whether or not the MCU 141 is uncontrollable (OP22). More specifically, when the MCU 141 is activated or while the MCU 141 is operating, in the case where no response has been received from the MCU 141 for a specific period of time or longer, the CPLD 144 determines that an operation failure has occurred in the MCU 141.

In the case where the MCU 141 is not uncontrollable (NO in OP22), the MCU 141 reads firmware stored in the USB memory 123 and detects an error in the control unit 100 (OP23).

In the case where the MCU 141 is uncontrollable (YES in OP22), the CPLD 144 of the control unit 100 turns on the power of the second power supply circuit 230 of the control unit 200 (OP27). More specifically, as processing to be performed after an operation failure occurs in the MCU 141 and the watchdog timer of the CPLD 144 times out since the MCU 141 does not detect heartbeat from the MCU 141, the CPLD 144 asserts a signal (WDT_ENABLE) for turning on the power of the control unit 200. Since the MCU 141 is uncontrollable, the power of each of the second power supply circuit 230 and the second power supply system device 240 of the control unit 200 is turned on by the CPLD 144.

Processing for tuning on the power of each of the second power supply circuit 230 and the second power supply system device 240 of the control unit 200 in the case where the MCU 141 is uncontrollable (YES in OP22) will be described below. The CPLD 144 asserts "High" (1) to a WDT_ENABLE signal output to the control circuit 221 of the control unit 200. Then, the CPLD 144 asserts "High" (1) to a POWER_ON signal output from the control circuit 221 to the second power supply circuit 230. Thus, the power of the second power supply circuit 230 of the control unit 200 is turned on. The register value of the GPIO 222 represents POWER_ENABLE: 0, OTHER_ENABLE: 0, WDT_ENABLE: 1, and POWER_ON: 1.

After detecting an error in the control unit 100 (OP23), the MCU 141 reads the firmware stored in the USB memory 123, and identifies the position in the control unit 100 at which the failure has occurred (OP24). The MCU 141 redundantly records the identified position of the failure in the control unit 100 into the USB memory 123 and the USB memory 223, which are configured redundantly (OP24). The MCU 141 controls the GPIO 122 of the control unit 100, and turns on the power of the second power supply system device 240 of the control unit 200 (OP25). More specifically, "High" (1) is asserted to an OTHER_ENABLE signal output from the Port 1 of the GPIO 122 to the control circuit 221 of the control unit 200. The power of the second power supply circuit 230 of the control unit 200 is turned on (OP25). The register value of the GPIO 122 represents POWER_ENABLE: 0, OTHER_ENABLE: 1, WDT_ENABLE: 0, and POWER_ON: 1.

The MCU 141 accesses the USB switch 224 of the control unit 200 via the port assign interface to change the setting for the USB switch 224 (OP26). After changing the setting for the USB switch 224, the MCU 241 of the control unit 200 becomes capable of accessing the USB memory 223 (OP26). More specifically, the MCU 141 sets the Port 1 of the USB switch 224 to the Port 0.

The CPLD 144 turns on the power of the second power supply circuit 230 of the control unit 200 (OP27). The CPLD 144 accesses the USB switch 224 of the control unit 200 via the port assign interface to change the setting for the USB switch 224 (OP28). That is, the CPLD 144 detects a failure in the MCU 141, which is the first controller, and accesses the USB switch 224 to change the setting for the USB switch 224. After changing the setting for the USB switch 224, the MCU 241 of the control unit 200 becomes capable of accessing the USB memory 223 (OP28). More specifically, the CPLD 144 sets the Port 1 of the USB switch 224 to the Port 0.

The MCU 241 of the control unit 200 reads and activates the activation program stored in the BOOT FMEM 243 (OP31). The MCU 241 reads the Port 0, the Port 1, the Port 2, and the Port 3, which are register values of the GPIO 222, and checks a factor of activation of the MCU 241.

In the case where the MCU 241 is activated when the MCU 141 is not uncontrollable (NO in OP22), "High" (1) is asserted to an OTHER_ENABLE signal output from the Port 1 of the GPIO 122 to the Port 2 of the GPIO 222. Thus, "High"(1) is set for the Port 2 of the register of the GPIO 222. "Low" (0) is set for the Port 0, the Port 1, and the Port 3 of the register of the GPIO 222.

The case where the MCU 241 is activated when the MCU 141 is uncontrollable (YES in OP22) will be explained below. When the MCU 241 reads and activates the activation program (OP31), the MCU 241 reads the Port 0, the Port 1, the Port 2, and the Port 3 of the register of the GPIO 222, and checks a factor of activation of the MCU 141. In this case, "High" (1) is asserted to WDT_ENABLE output from the CPLD 144 to the GPIO 222. Thus, "High" (1) is set for the Port 3 of the register of the GPIO 222. "Low" (0) is set for the Port 0, the Port 1, and the Port 2 of the register of the GPIO 222.

After confirming that "High" (1) is set for the Port 3 of the register of the GPIO 222, the MCU 241 controls the GPIO 222 via the I2C, and asserts a POWER_ENABLE signal from the control circuit 221 to the second power supply circuit 230. By asserting the POWER_ENABLE signal, even if the WDT_ENABLE signal from the CPLD 144 is negated, the power of the second power supply circuit 230 is not turned off. Thus, the power of the second power supply circuit 230 is kept on. Since the power of the second power supply circuit 230 is kept in the turned-on state, power is supplied to the second power supply system device 240. Negation of a signal represents invalidating the signal.

After reading and activating the activation program stored in the BOOT FMEM 243 (OP31), the MCU 241 reads the register value of the GPIO 222 and a log recording a failure factor of the control unit 100 recorded in the USB memory 223 (OP32). The MCU 241 identifies a factor of the failure of the control unit 100 on the basis of the log in which the factor of the failure is recorded (OP32).

The MCU 241 controls the GPIO 222 of the control unit 200 to turn off the power of the second power supply circuit 130 of the control unit 100 in which a failure has occurred (OP33). That is, after an activation instruction is issued to the MCU 241, the MCU 241, which is the second controller, issues to the control circuit 121, which is the activation controller in the control unit 100, which is an active processing apparatus, an instruction to turn off the second power supply circuit 130, which is the power supply of the first controller. More specifically, the MCU 241 asserts "High" (1) to an OTHER_ENABLE signal output from the Port 1 of the GPIO 222 to the Port 2 of the GPIO 122 of the control unit 100 via the I2C. "Low" (0) is asserted to a POWER_ON signal output from the Port 0 of the GPIO 122. As a result, the second power supply circuit 130 of the control unit 100 is turned off (OP33). Since the power of the second power supply circuit 130 of the control unit 100 is turned off, the power of the second power supply system device 140 is turned off (OP34).

After the power of the second power supply circuit 130 of the control unit 100 in which a failure has occurred is turned off, the control unit 200, which serves as a backup system, comes to serve as an active system. The control unit 200, which comes to serve as an active system, starts monitoring and controlling of the CPU 11, the memory 12, the PSU 13, the fan unit 14, and the communication interface 15 of the information processing apparatus 10, which are a unit group to be controlled (OP35).

With the use of the information processing system 1000 in an embodiment, since the power of the second power supply system device 240 of the control unit 200 is turned off, a reduction in the power consumption of the control unit 200 serving as a backup system is achieved. Compared to the use of the control unit 100 serving as an active system, about a 90 percent reduction of power consumption is achieved with the use of the control unit 200 in this embodiment.

With the technology disclosed in an embodiment, when a failure occurs in the control unit 100, which is an active processing apparatus, the power of the second power supply circuit 230, which is a power supply of the MCU 241 serving as a controller of a backup system, is turned on, in accordance with an external activation instruction. Thus, consistency with the software 123A used in an active system is achieved without turning on the second power supply circuit 230 serving as a power supply of a backup system at all times. Consequently, power saving in the entire information processing system 1000 is achieved.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing system comprising:
    a first control unit including
        a first memory configured to store first software, and
        a first controller configured to perform processing based on the first software and to update the first software in a case where an instruction to update the first software is received; and
    a second control unit configured to be coupled to the first control unit, the second control unit including
        a second memory configured to store second software that is the same as the first software,
        a second controller configured to perform processing based on the second software,
        a first power supply circuit configured to execute starting of power supply to the second controller in a case where a failure in the first control unit is detected, and
        a second power supply circuit configured to supply electric power to the second memory, irrespective of whether or not the failure in the first control unit is detected, wherein,
    in a case where the first controller receives the instruction to update, the first controller updates the second software,
    the first control unit further includes a third power supply circuit configured to supply electric power to the first controller, and
    the second controller outputs to the third power supply circuit an instruction to terminate power supply to the first controller, in response to the starting of the power supply from the first power supply circuit.

2. The information processing system according to claim 1, wherein
    in a case where the failure in the first control unit is detected and the first controller is capable of performing the processing based on the first software, the first controller outputs to the first power supply circuit an instruction to start power supply to the second controller.

3. The information processing system according to claim 1, wherein
    the first control unit is an active control unit, and
    the second control unit is a backup control unit.

4. The information processing system according to claim 1, further comprising:
    a third control unit configured to be coupled to the first control unit and the second control unit;
    wherein the first memory and the second memory store therein backup information for the third control unit.

5. An information processing method for use in a first control unit configured to include a first memory and a first controller, and a second control unit configured to include a second memory and a second controller and to be coupled to the first control unit, wherein electric power is supplied to the first memory and the second memory irrespective of whether or not a failure in the first control unit is detected, the method comprising:

performing, with the first control unit, processing based on first software stored in the first memory, updating the first software in a case where an instruction to update the first software is received, and matching second software stored in the second memory with the first software by updating the second software; and starting, in a case where a failure in the first control unit is detected, power supply to the second controller, and performing, with the second control unit, processing based on the second software, stopping, by the second controller, the power supply to the first controller in response to the starting of the power supply to the second controller.

6. The information processing method according to claim 5, wherein in a case where the failure in the first control unit is detected and the first controller is capable of performing processing based on the first software, the first controller starts the power supply to the second controller.

7. The information processing method according to claim 5, wherein the first control unit is an active control unit, and
the second control unit is a backup control unit.

8. The information processing system according to claim 1, wherein the first controller updates the second software in a case where the first controller receives the instruction to update the first software, even where the failure in the first control unit is not detected.

\* \* \* \* \*